United States Patent Office 3,816,390
Patented June 11, 1974

3,816,390
BENZOTHIAZOLYL-AZO META-ACYLAMIDO-ALKYLENE-ANILINE COMPOUNDS
Max A. Weaver, Kingsport, Tenn., assignor to Eastman Kodak Company, Rochester, N.Y.
No Drawing. Filed July 28, 1971, Ser. No. 167,041
Int. Cl. C09b 29/08, 29/36; D06p 3/26
U.S. Cl. 260—158                  11 Claims

ABSTRACT OF THE DISCLOSURE

Monoazo compounds having a 2-benzothiazolyl diazo component and an aniline or tetrahydroquinoline coupling component in which the nitrogen atom of the coupling component bears a carboxylic acylamidoalkyl group of the formula

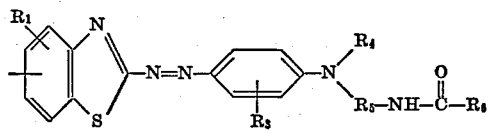

$R_1$, $R_2$, $R_3$, $R_4$, $R_5$ and $R_6$ are the usual dyestuff substituents. The compounds are particularly useful for dyeing polyamide fibers bright red to bluish-red shades and on which the compounds exhibit improved fastness to light and crocking and improved migration properties.

---

This invention concerns certain novel benzothiazolyl-azo compounds and polyamide textile materials dyed therewith.

The novel compounds of the invention have the general formula (I)

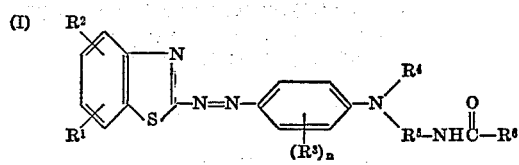

and (II)

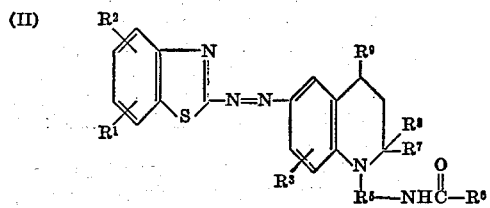

wherein $R^1$ is hydrogen, lower alkyl; lower alkyl substituted with hydroxy, carbamoyl, halogen, lower alkylsulfonyl, lower alkylsulfonamido, aryl, lower alkoxy,

—NHCO—$R^6$ or —OCO—$R^6$; lower alkoxy; lower alkoxy substituted with hydroxy, carbamoyl, halogen, lower alkylsulfonyl, lower alkylsulfonamido, aryl, lower alkoxy,

—NHCO—$R^6$ or —OCO—$R^6$; cyclohexoxy; lower alkylcyclohexoxy; halogen, or lower alkanoylamino;
$R^2$ is hydrogen or, when $R^1$ is hydrogen, lower alkyl or lower alkoxy, $R^2$ also can be lower alkyl, lower alkoxy or halogen;
$R^3$ is lower alkyl, lower alkoxy or —NHCO—$R^6$ and $n$ is 0, 1 or 2;
$R^4$ is lower alkyl; lower alkyl substituted with lower alkoxy, cyclohexoxy, aryl or aryloxy; lower alkenyl; cyclohexyl; lower alkylcyclohexyl; aryl, or, when $R^3$ is an alkyl group positioned ortho to the nitrogen atom to which $R^4$ is attached, $R^4$ is hydrogen;
$R^5$ is alkylene having two to four carbon atoms;
$R^6$ is hydrogen: lower alkyl; lower alkyl substituted with hydroxy, lower alkoxy, lower alkylthio, lower alkanoyloxy, cyano, carbamoyl, aryl, halogen, aryloxy or lower alkylsulfonyl; cyclohexyl; lower alkylcyclohexyl; lower alkoxy; furyl; alkenyl; or aryl;
$R^7$ is methyl or, when $R^8$ and $R^9$ each is hydrogen, $R^7$ also can be lower alkyl; and
$R^8$ and $R^9$ each is hydrogen or methyl.

My novel compounds are useful for dyeing synthetic textile materials such as cellulose acetate, polyester and polyamide fibers on which the azo compounds exhibit excellent fastness and dyeability properties. The novel azo compounds are particularly valuable for producing neutral red to bluish-red shades on polyamide fibers on which the azo compounds exhibit improved fastness to light and washing and improved dyeability properties including build-up, migration and crock-fastness. The compounds of the invention are suitable for dyeing polyamide carpet where migration, fastness to light and crocking and color yield are of great importance.

As used herein to describe an alkyl group or a group containing an alkyl moiety, "lower" designates a carbon content of one to about four carbon atoms. For example, the alkyl groups and the alkyl moieties of the alkylsulfonyl, alkoxy and alkanoylamino groups set forth in the definitions of $R^1$, $R^2$, $R^3$, $R^4$, $R^6$ and/or $R^7$ can be methyl, ethyl, propyl, isopropyl, butyl, isobutyl, etc. Chlorine and bromine are typical of the halogen atoms which can be present on the novel azo compounds. As used herein, "aryl" means unsubstituted phenyl or phenyl substituted with lower alkyl, lower alkoxy or halogen, e.g., tolyl, anisyl, ethoxyphenyl, bromophenyl, dichlorophenyl, etc. The substituents recited generically in the definitions of $R^1$ through $R^6$ are well known to those skilled in the art. When $(R^3)_n$ represents two substituents, the substituents preferably are positioned on the ring in a para relationship.

The azo compounds of the invention which have the formula (III)

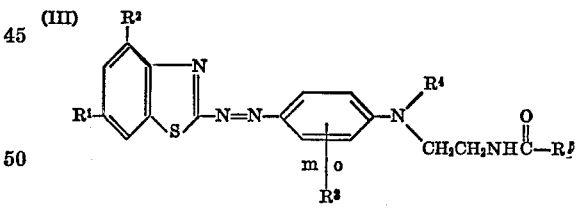

exhibit excellent fastness and dyeability properties on polyamide fibers and can be conveniently prepared. In Formula III, $R^1$ is hydrogen, lower alkyl, lower alkoxy, lower alkanoylamino, phenoxy, chlorine, bromine, lower alkoxyethoxy, lower alkoxypropoxy, lower alkylsulfonamidoethyl, lower alkylsulfonamidopropyl, lower alkanoylaminoethyl or lower alkanoylaminopropyl; $R^2$ is hydrogen or, when $R^1$ is hydrogen, lower alkyl or lower alkoxy, $R^2$ also can be lower alkyl, lower alkoxy or halogen; $R^3$ is methyl or m-lower alkanoylamino; $R^4$ is lower alkyl or, when $R^3$ is methyl positioned ortho to the nitrogen atom to which $R^4$ is attached, $R^4$ is hydrogen; and $R^6$ is lower alkyl, cyclohexyl, phenyl, 2-furyl or lower alkoxy. Compounds in which $R^2$ is hydrogen and $R^3$ is methyl positioned meta with respect to the nitrogen atom to which $R^4$ is attached are especially preferred.

The novel compounds of the invention are prepared by diazotizing the appropriate 2-aminobenzothiazole and coupling the resulting diazonium salt with an N-acylamido-alkylaniline coupler. The 2-aminobenzothiazole diazo precursors are prepared according to published techniques. For example, an aniline compound can be reacted with a thiocyanate in the presence of bromine and acetic acid to yield the corresponding o-thiocyanatoaniline which is then treated with alkali to effect ring closure. Another technique that can be used is reacting an aniline compound with a thiocyanate in the presence of a mineral acid to obtain an arylthiourea which is converted to the 2-aminobenzothiazole by treatment with bromine.

The couplers also are synthesized by known procedures using known or readily-obtainable intermediates. For example, an N-cyanoalkyl-N-alkylaniline can be hydrogenated to the corresponding amine which then is treated with known acylating agents to yield the N-acylamidoalkyl-N-alkylaniline compound. The aniline ring of the couplers is unsubstituted at the position para to the aniline nitrogen atom to permit coupling at that position.

The preparation and use of the novel compounds of the invention are further illustrated by the following examples:

EXAMPLES 1–10

To 25 ml. of conc. $H_2SO_4$ is added with stirring 3.60 g. $NaNO_2$. The solution is cooled and 50 ml. of 1:5 acid (1 part propionic:5 parts acetic acid) is added below 15° C. At less than 5° C. is added 2-amino-6-methoxybenzothiazole (9.0 g., .05 mole) followed by 50 ml. 1:5 acid. The reaction is stirred at 0–5° C. for 2.0 hours. The following couplers (.005 mole) are dissolved in 20 ml. of 1:5 acid and the solutions chilled in an ice bath.

N-(2-Acetamidoethyl)-N-ethyl-m-toluidine (Example 1)
N-(2-Acetamidoethyl)-N-ethylaniline (Example 2)
N-(2-Acetamidoethyl)-N-ethyl-m-acetamidoaniline (Example 3)
N-(2-Ethoxycarbonylaminoethyl)-N-ethyl-m-toluidine (Example 4)
N-(2-Acetamidoethyl)-2,7-dimethyl-1,2,3,4-tetrahydroquinoline (Example 5)
N-(2-Propionamidoethyl)-N-ethyl-m-toluidine (Example 6)
N-(2-Acetamidoethyl)-o-toluidine (Example 7)
N-(2-Acetamidoethyl)-2-methyl-5-acetamidoaniline (Example 8)
N-(2-Acrylamidoethyl)-N-ethyl-m-toluidine (Example 9)
N-[2-(2-Chloropropionamido)ethyl]-N-ethyl-m-toluidine (Example 10).

To each chilled coupler solution is added .005 m. aliquot of the diazotized amine. The coupling is neutralized to pH of 3–4 by adding ammonium acetate and allowed to stand for 1 hour at less than 15° C. The resulting azo compounds are precipitated by addition of water, collected by filtration, washed with water and dried in air. If necessary, the azo compounds can be purified by reslurrying in hot methanol or ethanol, followed by cooling and filtering. Each of the azo compounds produces deep red shades on nylon fabrics and exhibit excellent fastness, build-up and migration properties.

EXAMPLES 11–20

To 150 g. of 60% acetic acid containing 10 g. of concn. $H_2SO_4$, is added 8.2 g. (.05 mole) of 2-amino-6-methylbenzothiazole at room temperature. The solution is cooled to —5° C., and a solution of 3.6 g. $NaNO_2$ in 20 ml. conc. $H_2SO_4$ is added below 0° C. The reaction mixture is stirred at —5 to 0° C. for 1.5 hours. Each of the following couplers (.005 mole) is dissolved in 20 ml. portions of 15% $H_2SO_4$, and the solutions chilled in an ice bath.

N-(2-Acetamidoethyl)-N-ethyl-m-toluidine (Example 11)
N-(2-Acetamidoethyl)-N-ethylaniline (Example 12)
N-(2-Acetamidoethyl)-N-ethyl-m-acetamidoaniline (Example 13)
N-(2-Acetamidoethyl)-o-toluidine (Example 14)
N-(2-Propionamidoethyl)-N-ethylaniline (Example 15)
N-(2-Ethoxycarbonylaminoethyl)-N-ethylaniline (Example 16)
N-(2-Acetamidoethyl)-2,7-dimethyl-1,2,3,4-tetrahydroquinoline (Example 17)
N-(2-Acrylamidoethyl)-N-ethylaniline (Example 18)
N-(2-Isobutyramidoethyl)-N-ethylaniline (Example 19)
N-[2-(2-Hydroxypropionamido)ethyl]-N-ethyl-m-toluidine (Example 20).

To each chilled coupler solution is added a .005 mole aliquot of the diazonium solution. The coupling mixture is treated with ammonium acetate to pH of 3–4 and allowed to stand for 1 hour. The azo compounds are precipitated by addition of water, collected by filtration, washed with water and dried in air. The compounds are recrystallized or reslurried in methanol or ethanol for purification. Each of the azo compounds obtained produces a fast red shade on polyamide fibers.

EXAMPLE 21

Preparation of 2-amino-6-(2-methanesulfonamidoethyl) benzothiazole. A solution of p-(2-methanesulfonamido) aniline (42.8 g.) and sodium thiocyanate (32.4 g.) in 300 ml. of acetic acid is treated dropwise at 20–30° C. with 32.0 g. of bromine in 50 ml. of acetic acid. The reaction mixture is stirred at about 30° C. for 1 hour. The solid hydrobromide is collected by filtration, washed with acetic acid and then dissolved in 1 liter of water. The free amine is precipitated by adding ice and concn. $NH_4OH$. The product is collected by filtration and dried in air. The yield is 43.5 g. of product melting at 150–152° C.

EXAMPLES 22–25

The product from Example 21 (5.42 g., 0.2 mole) is diazotized in 1:5 acid with nitrosyl sulfuric acid as illustrated previously, and the diazonium solution (.005 mole aliquot) is added to a chilled solution of .005 m. of each of the following couplers dissolved in 20 ml. 1:5 acid.

N-(2-Acetamidoethyl)-N-ethyl-m-toluidine (Example 22)
N-(2-Acetamidoethyl)-N-ethylaniline (Example 23)
N-(2-Acetamidoethyl)-N-ethyl-m-acetamidoaniline (Example 24)
N-(2-Propionamidoethyl)-N-ethyl-m-toluidine (Example 25).

The coupling mixtures are buffered to pH of 3–4 by adding ammonium acetate and allowed to stand for 1 hour. The azo compounds are precipitated by drowning in water and are collected by filtration, washed with water and dried in air. The dyes may be purified by reslurrying in hot methanol or ethanol. The azo compounds produce fast red shades on polyamide fibers and have excellent dyeability and washfastness.

The compounds set forth in the examples of Tables I and II are prepared according to the procedures described in the preceding examples conform to the formulas,

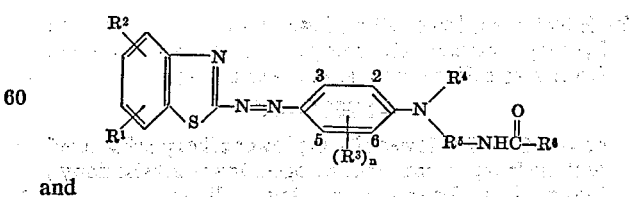

and

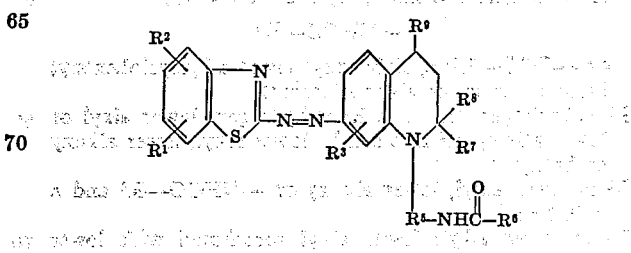

respectively, and produce red shades on polyamide fibers.

TABLE I

| Example number | $R^1, R^2$ | $(R^3)n$ | $R^4$ | $R^5$ | $R^6$ |
|---|---|---|---|---|---|
| 26 | 4-CH₃ | 3-CH₃ | —C₂H₅ | —CH₂CH₂— | —CH₃ |
| 27 | 5-CH₃ | 3-CH₃ | —C₂H₅ | —CH₂CH₂— | —CH₃ |
| 28 | 6-CH₃ | 3-CH₃ | —C₂H₅ | —CH₂CH₂— | —CH₃ |
| 29 | 4,6-di-CH₃ | 3-CH₃ | —C₂H₅ | —CH₂CH₂— | —CH₃ |
| 30 | 4,7-di-CH₃ | 3-CH₃ | —C₂H₅ | —CH₂CH₂— | —CH₃ |
| 31 | 5,6-di-CH₃ | 3-CH₃ | —C₂H₅ | —CH₂CH₂— | —CH₃ |
| 32 | 4-OCH₃-7-CH₃ | 3-CH₃ | —C₂H₅ | —CH₂CH₂— | —CH₃ |
| 33 | 4-CH₂CH₂OH | 3-CH₃ | —C₂H₅ | —CH₂CH₂— | —CH₃ |
| 34 | 4-CH₂CH₂Cl | 3-CH₃ | —C₂H₅ | —CH₂CH₂— | —CH₃ |
| 35 | 4-OCH₃ | 3-CH₃ | —C₂H₅ | —CH₂CH₂— | —CH₃ |
| 36 | 4-CH₂CH₂OCH₃ | 3-CH₃ | —C₂H₅ | —CH₂CH₂— | —CH₃ |
| 37 | 5-NHCOCH₃ | 3-CH₃ | —C₂H₅ | —CH₂CH₂— | —CH₃ |
| 38 | 6-NHCOCH₃ | 3-CH₃ | —C₂H₅ | —CH₂CH₂— | —CH₃ |
| 39 | 6-C₆H₅ | 3-CH₃ | —C₂H₅ | —CH₂CH₂— | —CH₃ |
| 40 | 6-OC₆H₅ | 3-CH₃ | —C₂H₅ | —CH₂CH₂— | —CH₃ |
| 41 | 6-C₆H₁₁ | 3-CH₃ | —C₂H₅ | —CH₂CH₂— | —CH₃ |
| 42 | 6-C(CH₃)₃ | 3-CH₃ | —C₂H₅ | —CH₂CH₂— | —CH₃ |
| 43 | 6-OC₆H₁₁ | 3-CH₃ | —C₂H₅ | —CH₂CH₂— | —CH₃ |
| 44 | 6-OCH₂C₆H₅ | 3-CH₃ | —C₂H₅ | —CH₂CH₂— | —CH₃ |
| 45 | 6-Cl | 3-CH₃ | —C₂H₅ | —CH₂CH₂— | —CH₃ |
| 46 | 5-Br | 3-CH₃ | —C₂H₅ | —CH₂CH₂— | —CH₃ |
| 47 | 4-Cl | 3-CH₃ | —C₂H₅ | —CH₂CH₂— | —CH₃ |
| 48 | 6-CH₂CH₂OH | 3-CH₃ | —C₂H₅ | —CH₂CH₂— | —CH₃ |
| 49 | 6-CH₂CH₂OCH₃ | H | —C₂H₅ | —CH₂CH₂— | —CH₃ |
| 50 | 6-CH₂CH₂OCH₃ | 3-NHCOCH₃ | —C₂H₅ | —CH₂CH₂— | —CH₃ |
| 51 | 6-CH₂CH₂OCH₃ | 2-CH₃ | H | —CH₂CH₂CH₂— | —CH₃ |
| 52 | 6-CH₂CH₂Cl | H | —C₂H₅ | —CH₂CH₂CH₂— | —CH₃ |
| 53 | 6-CH₂CH₂NHCOCH₃ | H | —C₂H₅ | —CH₂CH₂CH₂— | —CH₃ |
| 54 | 6-CH₂CH₂NHCOCH₃ | 3-CH₃ | —C₂H₅ | —CH₂CH₂CH₂— | —CH₃ |
| 55 | 6-CH₂NHCOCH₃ | 3-CH₃ | —C₂H₅ | —CH₂CH₂CH₂— | —CH₃ |
| 56 | 6-CH₂CONH₂ | 3-CH₃ | —C₂H₅ | —CH₂CH₂— | —CH₃ |
| 57 | 6-CH₂CH₂NHCOC₆H₅ | 3-CH₃ | —C₂H₅ | —CH₂CH₂— | —CH₃ |
| 58 | 6-CH₂CH₂SO₂CH₃ | 3-CH₃ | —C₂H₅ | —CH₂CH₂ | —CH₃ |
| 59 | 6-OCH₂CH₂C₆H₅ | 3-CH₃ | —C₂H₅ | —CH₂CH₂— | —CH₃ |
| 60 | 6-OCH₂CH₂OOCCH₃ | 3-CH₃ | —C₂H₅ | —CH₂CH₂— | —CH₃ |
| 61 | 6-OCH₂CH₂OOCOC₂H₅ | 3-CH₃ | —C₂H₅ | —CH₂CH₂— | —CH₃ |
| 62 | 6-OCH₂CH₂COOCH₃ | 3-CH₃ | —C₂H₅ | —CH₂CH₂CH₂— | —CH₃ |
| 63 | 6-OCH₂CH₂NHCOCH₃ | 3-CH₃ | —C₂H₅ | —CH₂CH₂CH₂— | —CH₃ |
| 64 | 6-OCH₂CH₂OCH₂CH₂OH | 3-CH₃ | —C₂H₅ | —CH₂CH₂— | —CH₃ |
| 65 | 6-OCH₂CH₂OCH₂CH₂OCH₃ | 3-CH₃ | —C₂H₅ | —CH₂CH₂— | —CH₃ |
| 66 | 6-CH₂CH₂CONH₂ | 3-CH₃ | —C₂H₅ | —CH₂CH₂— | —CH₃ |
| 67 | 6-OCH₂CH(OH)CH₂OH | 3-CH₃ | —C₂H₅ | —CH₂CH₂— | —CH₃ |
| 68 | 6-OC₂H₅ | 3-CH₃ | —C₂H₅ | —CH₂CH₂— | —CH₃ |
| 69 | 6-OC₂H₅ | H | —C₂H₅ | —(CH₂)₄— | —CH₃ |
| 70 | 6-OC₂H₅ | 2-CH₃ | H | —CH₂CH₂— | —OC₂H₅ |
| 71 | 6-OC₂H₅ | 2,5-di-CH₃ | H | —CH₂CH₂— | —C₆H₅ |
| 72 | 6-OC₂H₅ | 3-NHCOCH₃ | —C₂H₅ | —CH₂CH₂— | —C₆H₁₁ |
| 73 | 6-OC₂H₅ | 2-CH₃-5-NHCOCH₃ | H | —CH₂CH₂— | —CH(CH₃)₂ |
| 74 | H | 3-NHCOC₂H₅ | —C₂H₅ | —CH₂CH₂— | —CH=CH₂ |
| 75 | H | 3-NHCOOC₂H₅ | —C₂H₅ | —CH₂CH₂— | —CH₂OH |
| 76 | 6-OC₂H₅ | 3-NHCOCH₂OH | —C₂H₅ | —CH₂CH₂— | —CH₂CH₂OH |
| 77 | 6-OC₂H₅ | 3-NHCOCH₂OOCCH₃ | —C₂H₅ | —CH₂CH₂— | —CH₂OCH₃ |
| 78 | 6-OC₂H₅ | 3-NHCOCH₂CONH₂ | —C₂H₅ | —CH₂CH₂— | —CH₂OC₆H₅ |
| 79 | 6-OC₂H₅ | 3-NHCOCH₂CN | —C₂H₅ | —CH₂CH₂— | —CH₂C₆H₅ |
| 80 | 6-OC₂H₅ | 3-NHCOC₆H₅ | —C₂H₅ | —CH₂CH₂— | —CH=CHC₆H₅ |
| 81 | 6-OC₂H₅ | 3-NHCOC₆H₁₁ | —C₂H₅ | —CH₂CH₂— | —OCH₂CH₂Cl |
| 82 | 6-OC₂H₅ | 3-NHCOCH₂CH₂OH | —C₂H₅ | —CH₂CH₂— | —CH₂SO₂CH₃ |
| 83 | 6-OC₂H₅ | 3-NHCONHC₂H₅ | —C₂H₅ | —CH₂CH₂— | —CH₂CH₂Cl |
| 84 | 6-OC₂H₅ | 3-NHCOCH₂C₆H₅ | —C₂H₅ | —CH₂CH₂— | —CH₂CH₂COOC₂H₅ |
| 85 | 6-OC₂H₅ | 3-NHCOCH₂OC₆H₅ | —C₂H₅ | —CH₂CH₂— | —C=CH—CH=CH—O |
| 86 | 6-OC₂H₅ | 3-NHCOCH₂OCH₃ | —C₂H₅ | —CH₂CH₂— | Same as above. |
| 87 | 6-CH₃ | 3-NHCOCH₂CH₂Cl | —C₂H₅ | —CH₂CH₂— | —CH₃ |
| 88 | 6-C₂H₅ | H | —C₆H₁₁ | —CH₂CH₂— | —CH₃ |
| 89 | 6-CH₃ | H | —C₆H₅ | —CH₂CH₂— | —CH₃ |
| 90 | 6-CH₃ | 3-CH₃ | —CH₂CH=CH₂ | —CH₂CH₂— | —CH₃ |
| 91 | 6-CH₃ | 3-CH₃ | —CH₂CH₂OC₆H₅ | —CH₂CH₂— | —CH₃ |
| 92 | 6-CH₃ | 3-CH₃ | —CH₂CH₂C₆H₅ | —CH₂CH₂— | —CH₃ |
| 93 | 6-CH₃ | 3-CH₃ | —CH₂CH₂OC₆H₁₁ | —CH₂CH₂— | —CH₃ |
| 94 | 6-CH₃ | 3-CH₃ | —CH₂CH₂OCH₃ | —CH₂CH₂— | —CH₃ |
| 95 | 6-CH₃ | 3-CH₃ | —CH₂CH₂OCH(CH₃)₂ | —CH₂CH₂— | —CH₃ |
| 96 | 6-CH₃ | 3-CH₃ | —CH(CH₃)C₂H₅ | —CH₂CH₂— | —CH₃ |
| 97 | 6-CH₃ | 3-CH₃ | —CH₂C₆H₁₁ | —CH₂CH₂— | —CH₃ |
| 98 | 6-CH₃ | 3-CH₃ | —CH₂C₆H₅ | —CH₂CH₂— | —CH₃ |
| 99 | 6-CH(CH₃)₂ | 3-CH₃ | —C₂H₅ | —CH₂CH₂— | —CH₃ |
| 100 | 6-OCH(CH₃)C₂H₅ | 3-CH₃ | —C₂H₅ | —CH₂CH₂— | —CH₃ |
| 101 | 6-CH₃ | 2,5-di-CH₃ | —C₂H₅ | —CH₂CH₂— | —C₂H₅ |
| 102 | 6-OCH₃ | 3-NHCOCH₂CH₃ | —C₂H₅ | —CH₂CH₂— | —CH₃ |
| 103 | 6-OCH₂C₆H₁₁ | 3-CH₃ | —C₂H₅ | —CH₂CH₂— | —CH₃ |
| 104 | 6-OCH₂C₆H₁₀-p-CH₂OH | 3-CH₃ | —C₂H₅ | —CH₂CH₂— | —CH₃ |

TABLE II

| Example number | $R^1, R^2$ | $R^3$ | $R^7, R^8, R^9$ | $R^5$ | $R^6$ |
|---|---|---|---|---|---|
| 105 | 6-CH₃ | 7-CH₃ | 2,2,4-tri-CH₃ | —CH₂CH₂— | —CH₃ |
| 106 | 6-CH₃ | H | 2,2,4-tri-CH₃ | —CH₂CH₂— | —CH₃ |
| 107 | 6-CH₃ | 7-NHCOCH₃ | 2,2,4-tri-CH₃ | —CH₂CH₂— | —CH₃ |
| 108 | 6-CH₃ | H | 2-CH(CH₃)₂ | —CH₂CH₂— | —CH₃ |
| 109 | 6-CH₃ | 7-CH₃ | 2-CH(CH₃)₂ | —CH₂CH₂— | —CH₃ |
| 110 | 6-CH₃ | 7-CH₃ | 2-CH₃ | —CH₂CH₂— | —C₂H₅ |
| 111 | 6-CH₃ | 7-CH₃ | 2-CH₂CH₂ | —CH₂CH₂— | —OC₂H₅ |
| 112 | 6-OCH₃ | 7-CH₃ | 2-CH(CH₃)₂ | —CH₂CH₂— | —C₂H₅ |
| 113 | 6-OCH₃ | H | 2,2,4-tri-CH₃ | —CH₂CH₂— | —CH₃ |
| 114 | 6-OCH₃ | 7-NHCOCH₃ | 2-CH₃ | —CH₂CH₂— | —CH₃ |
| 115 | 6-OC₂H₅ | 7-CH₃ | 2-CH₃ | —CH₂CH₂— | —CH₂CH₂OH |
| 116 | 4-CH₃ | 7-CH₃ | 2-CH₃ | —CH₂CH₂CH₂— | —CH₂OCH₃ |
| 117 | 5-CH₃ | 7-CH₃ | 2-CH₃ | —CH₂CH₂CH₂— | —CH₂OH |
| 118 | 4-OCH₃ | 7-CH₃ | 2-CH₃ | —CH₂CH₂— | —C₆H₁₁ |
| 119 | 5-NHCOCH₃ | 7-CH₃ | 2-CH₃ | —CH₂CH₂— | —C=CH—CH=CH—O |
| 120 | 6-NHCOCH₃ | 7-CH₃ | 2-CH₃ | —CH₂CH₂— | —C₆H₅ |

TABLE II—Continued

| Example number | R¹, R² | R³ | R⁷, R⁸, R⁹ | R⁵ | R⁶ |
|---|---|---|---|---|---|
| 121 | 6-Cl | 7-CH₃ | 2-CH₃ | —CH₂CH₂— | —C₅H₁₁ |
| 122 | 6-OCH₂CH₂OCH₃ | 7-CH₃ | 2-CH₃ | —CH₂CH₂— | —CH₂C₆H₅ |
| 123 | 6-OCH₂CH₂NHSO₂CH₃ | 7-CH₃ | 2-CH₃ | —CH₂CH₂— | —CH₂OC₆H₅ |
| 124 | 6-OCH₂CH₂NHSO₂CH₃ | 7-CH₃ | 2-CH₃ | —CH₂CH₂— | —CH₂CH₂Cl |
| 125 | 6-OCH₂CH₂NHSO₂CH₃ | 7-CH₃ | 2-CH₃ | —CH₂CH₂— | —CH=CH₂ |
| 126 | 6-OCH₂CH₂NHCOCH₃ | 7-CH₃ | 2-CH₃ | —CH₂CH₂— | —CH₂CN |
| 127 | 6-OCH₂CH₂NHCOCH₃ | H | 2,2,4-tri-CH₃ | —CH₂CH₂— | —CH₃ |
| 128 | 6-OCH₂CH₂NHCOCH₃ | 7-CH₃ | 2,2,4-tri-CH₃ | —CH₂CH₂— | —CH₃ |
| 129 | 6-OCH₂CH₂OOCCH₃ | 7-CH₃ | 2,2,4-tri-CH₃ | —CH₂CH₂— | —CH₃ |
| 130 | 4-CH₂CH₂OH | 7-CH₃ | 2-CH₃ | —CH₂CH₂— | —CH₃ |
| 131 | 6-OC₆H₁₁ | 7-CH₃ | 2-CH₃ | —CH₂CH₂— | —CH₃ |
| 132 | 6-OC₆H₅ | 7-CH₃ | 2-CH₃ | —CH₂CH₂— | —CH₃ |
| 133 | 6-OCH₂CH₂C₆H₅ | 7-CH₃ | 2-CH₃ | —CH₂CH₂— | —CH₃ |
| 134 | 6-NHCOOC₂H₅ | 7-CH₃ | 2-CH₃ | —CH₂CH₂— | —CH₃ |
| 135 | 6-CH₂NHCOCH₃ | 7-CH₃ | 2-CH₃ | —CH₂CH₂— | —CH₃ |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pats. 3,100,134 and 3,320,021. The following example illustrates a method for applying the novel compounds to polyamide fibers.

EXAMPLE 115

The azo compound (16.7 mg.) of Example 1 is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for 1 hour. The dyed fabric is then removed from the dyebath, rinsed with water and dried in an oven at 250° F. The fabric is dyed a bright shade of red exhibiting excellent fastness properties when tested in accordance with the procedures described in the Technical Manual of the American Association of Textile Chemists and Colorists, 1968 edition.

The polyamide materials which can be dyed with the novel azo compounds are well known and include nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright fast shades by the compounds of the invention is set forth in U.S. Pat. 3,100,134.

The invention has been described in detail with particular reference to preferred embodiments thereof, but it will be understood that variations and modifications can be effected within the spirit and scope of the invention.

I claim:

1. A compound having the formula

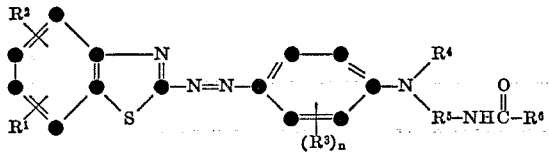

wherein
R¹ is hydrogen; lower alkyl; lower alkyl substituted with hydroxy, carbamoyl, chlorine, bromine, lower alkylsulfonyl, lower alkylsulfonamido, aryl, lower alkoxy, —NHCO—R⁶ or —OCO—R⁶; lower alkoxy; lower alkoxy substituted with hydroxy, carbamoyl, chlorine, bromine, lower alkylsulfonyl, lower alkylsulfonamido, aryl, lower alkoxy, —NHCO—R⁶ or —OCO—R⁶; cyclohexoxy; lower alkylcyclohexoxy; chlorine; bromine; or lower alkanoylamino;

R² is hydrogen or, when R¹ is hydrogen, lower alkyl or lower alkoxy, R² also can be lower alkyl, lower alkoxy, chlorine or bromine;

R³ is lower alkyl, lower alkoxy or —NHCO—R⁶ and n is 0, 1 or 2;

R⁴ is lower alkyl; lower alkyl substituted with lower alkoxy, cyclohexoxy, aryl or aryloxy; lower alkenyl; cyclohexyl; lower alkylcyclohexyl; aryl; or, when R³ is an alkyl group positioned ortho to the nitrogen atom to which R⁴ is attached, R⁴ is hydrogen;

R⁵ is alkylene having two to four carbon atoms; and

R⁶ is hydrogen; lower alkyl; lower alkyl substituted with hydroxy, lower alkoxy, lower alkylthio, lower alkanoyloxy, cyano, carbamoyl, aryl, chlorine, bromine, aryloxy or lower alkylsulfonyl; cyclohexyl; lower alkylcyclohexyl; lower alkoxy; furyl; allyl; or aryl;

in which each aryl or aryloxy is phenyl or phenoxy, respectively, or phenyl or phenoxy substituted with lower alkyl, lower alkoxy, chlorine or bromine.

2. A compound according to claim 1 having the formula

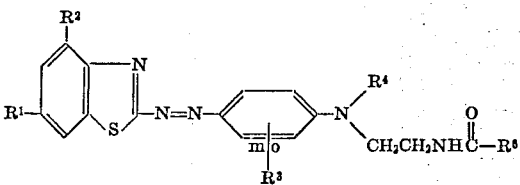

wherein
R¹ is hydrogen, lower alkyl, lower alkoxy, lower alkanoylamino, phenoxy, chlorine, bromine, lower alkoxyethoxy, lower alkoxypropoxy, lower alkylsulfonamidoethyl, lower alkylsulfonamidopropyl, lower alkanoylaminoethyl or lower alkanoylaminopropyl;

R² is hydrogen or, when R¹ is hydrogen, lower alkyl or lower alkoxy, R² also can be lower alkyl, lower alkoxy chlorine or bromine;

R³ is methyl or lower alkanoylamino positioned at the meta position;

R⁴ is lower alkyl or, when R³ is methyl positioned ortho to the nitrogen atom to which R⁴ is attached, R⁴ is hydrogen; and R⁶ is lower alkyl, cyclohexyl, phenyl, 2-furyl or lower alkoxy.

3. A compound according to claim 2 wherein R² is hydrogen and R³ is methyl positioned at the meta position.

4. A compound according to claim 1 having the formula

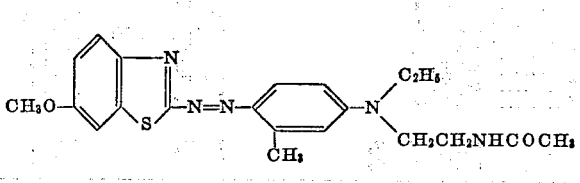

5. A compound according to claim 1 having the formula

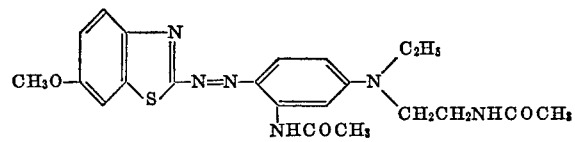

6. A compound according to claim 1 having the formula

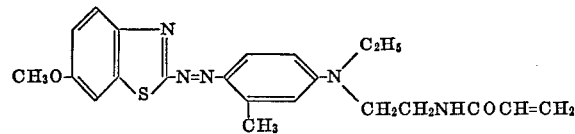

7. A compound according to claim 1 having the formula

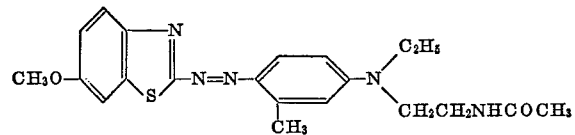

8. A compound according to claim 1 having the formula

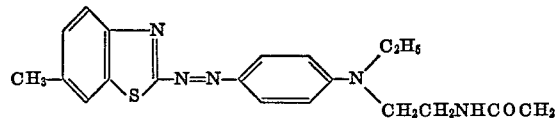

9. A compound according to claim 1 having the formula

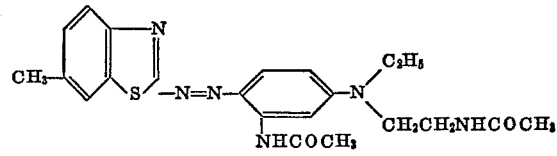

10. A compound acording to claim 1 having the formula

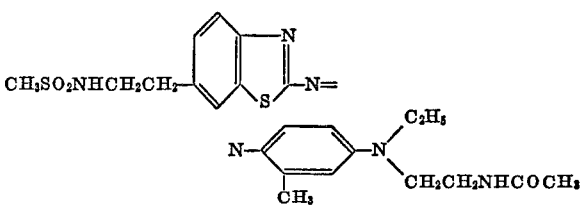

11. A compound according to claim 1 having the formula

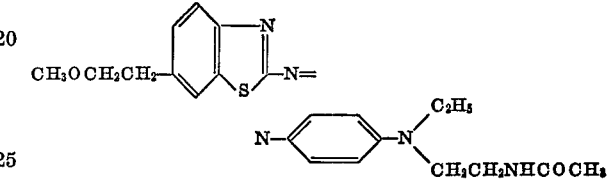

References Cited
UNITED STATES PATENTS

| | | | |
|---|---|---|---|
| 2,346,013 | 4/1944 | Dickey | 260—205 |
| 3,287,347 | 11/1966 | Hahn et al. | 260—158 |
| 3,417,139 | 12/1968 | Towle et al. | 260—158 R |
| 3,455,898 | 7/1969 | Seefelder et al. | 260—158 |

FLOYD D. HIGEL, Primary Examiner

U.S. Cl. X.R.

8—41 B; 260—155, 305, 471 C 562 R